US012744849B2

(12) United States Patent
Pearce et al.

(10) Patent No.: US 12,744,849 B2
(45) Date of Patent: Sep. 22, 2026

(54) POLICY-ENABLED CALL HUNTING

(71) Applicant: Cisco Technology, Inc., San Jose, CA (US)

(72) Inventors: Christopher E. Pearce, Dallas, TX (US); Ellis Wade Hamblin, Allen, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 89 days.

(21) Appl. No.: 18/450,044

(22) Filed: Aug. 15, 2023

(65) Prior Publication Data

US 2025/0063119 A1 Feb. 20, 2025

(51) Int. Cl.
*H04M 3/00* (2024.01)
*H04M 3/523* (2006.01)

(52) U.S. Cl.
CPC .................................. *H04M 3/5232* (2013.01)

(58) Field of Classification Search
CPC ........... H04M 3/5232; H04M 3/42114; H04M 3/523; H04M 3/56; H04M 3/42
See application file for complete search history.

(56) References Cited

U.S. PATENT DOCUMENTS 8,880,666 B2 * 11/2014 Aaron ..................... H04L 47/20 709/219
8,996,670 B2 * 3/2015 Kupinsky ........... H04L 41/0894 455/405
2012/0099719 A1 4/2012 Erb
2013/0016822 A1 1/2013 Vendrow
2014/0086107 A1 3/2014 Shi
2014/0270109 A1 * 9/2014 Riahi ..................... G06N 20/00 379/88.01
2018/0270351 A1 * 9/2018 Vandikas .......... H04M 3/42008
2020/0213443 A1 7/2020 Synal et al.

FOREIGN PATENT DOCUMENTS

EP 2137924 A2 12/2009

OTHER PUBLICATIONS

"What is Curri?" Cisco Developer, retrieved from https://developer.cisco.com/site/curri/discover/what-is-curri/ on Jul. 19, 2023, 1 Page.

* cited by examiner

*Primary Examiner* — Rasha S Al Aubaidi
(74) *Attorney, Agent, or Firm* — Edell, Shapiro & Finnan, LLC

(57) ABSTRACT

Provided herein are techniques to facilitate policy-enabled call hunting for environments involving a cloud-based call routing policy enforcement point and a call hunting policy decision point that may be provided by an enterprise. In one instance, a method can be performed that may include obtaining an incoming call directed to an enterprise entity; identifying a candidate list of enterprise endpoint devices to which to route the incoming call; transmitting, to a routing policy server, a query regarding whether the incoming call is to be routed to the candidate list of enterprise endpoint devices, wherein the query includes an indication of the candidate list of enterprise devices; and obtaining, from the routing policy server, a response including an updated list of enterprise endpoint devices to which to route the incoming call, wherein the updated list is different than the candidate list.

20 Claims, 8 Drawing Sheets

220

224

Sample Hunt Group

Overview

Enable Hunt Group

General Settings Manage >

Phone Number 116101 >

Call Forwarding Disabled >

Agents Manage >

Call Routing Pattern Manage >

Call Routing Options Manage >

222

COMPUTING DEVICE

402 PROCESSOR(s)

404 MEMORY ELEMENT(s)

406 STORAGE

408

410 BASEBAND PROCESSOR(s) (MODEM(s))

412 RF TRANSCIEVER(s)

414

416 I/O

420 CONTROL LOGIC

430 NEWORK PROCESSOR UNIT(s)

432 I/O

I/O

POLICY-ENABLED CALL HUNTING

TECHNICAL FIELD

The present disclosure relates to network equipment and services.

BACKGROUND

Call routing is a fundamental aspect of telephony. In some instances, such as in an enterprise environment, it is desirable to route an incoming call to a number of enterprise endpoints. However, the availability of users to answer an incoming call at enterprise endpoints is often unknown at the time that a call is received. Thus, there are significant challenges with providing call routing in enterprise environments.

DETAILED DESCRIPTION

Overview

In at least one embodiment, a computer-implemented method is provided that may include obtaining an incoming call directed to an enterprise entity; identifying a candidate list of enterprise endpoint devices to which to route the incoming call; transmitting, to a routing policy server, a query regarding whether the incoming call is to be routed to the candidate list of enterprise endpoint devices, wherein the query includes an indication of the candidate list of enterprise devices; and obtaining, from the routing policy server, a response including an updated list of enterprise endpoint devices to which to route the incoming call, wherein the updated list is different than the candidate list.

EXAMPLE EMBODIMENTS

Figure 1A:
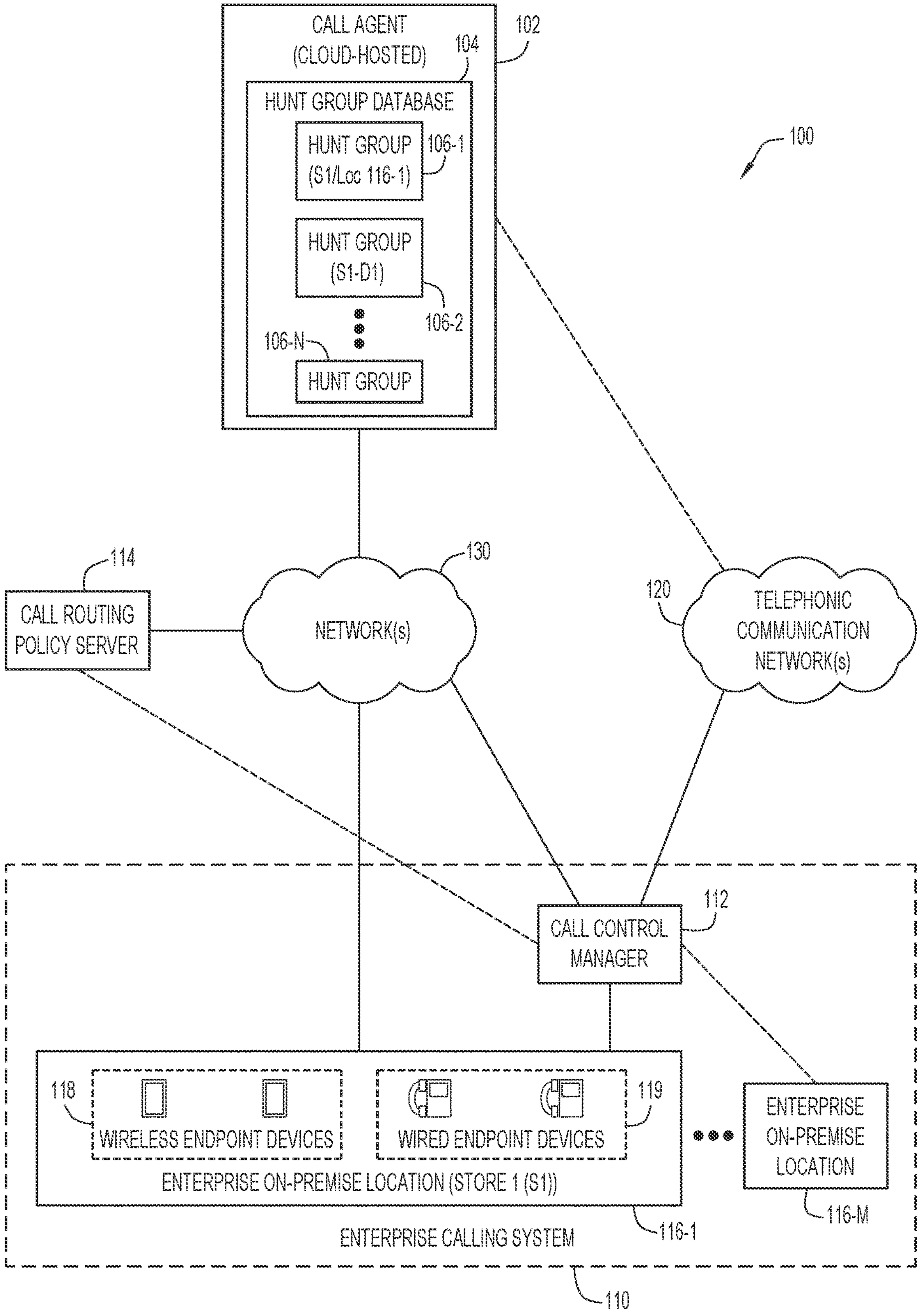
FIG. 1A is a block diagram of a system that may be provided to facilitate policy-enabled call hunting, according to an example embodiment.

Referring to FIG. 1A, FIG. 1A is a block diagram of a system 100 that may be provided to facilitate policy-enabled call hunting for an enterprise entity, according to an example embodiment. In at least one embodiment, system 100 may include a call agent 102, which may be considered a cloud-based or cloud-hosted call agent, an enterprise calling system 110, a call routing policy server 114, and one or more network(s) 130.

Enterprise calling system 110 may include a call control manager 112 and one or more enterprise on-premise locations, such as an enterprise on-premise location 116-1 thru an on-premise location 116-M. Each enterprise on-premise location 116-1-116-M may include any number of enterprise endpoint devices that can facilitate telephonic communications, such Internet Protocol (IP)-telephony communications, or the like. For example, as shown in FIG. 1A, enterprise on-premise location 116-1 can include any number of wireless endpoint devices 118 and any number of wired endpoint devices 119.

In various embodiments, wireless endpoint devices 118 may include, but not be limited to, mobile phones, mobile handsets, tablets, or the like that are capable of any combination of wireless wide area (e.g., cellular) communications and wireless local area (e.g., Wi-Fi) communications. In various embodiments, wired endpoint devices 119 may include, but not be limited to, wired phones, Voice over IP (VOIP) phones, and/or the like. Wireless and wired endpoint devices may be referred to herein generally as ‘endpoints’.

Also shown in FIG. 1A one or more telephonic communication network(s) 120 that may facilitate telephonic communications, such as IP-telephony communications. In various embodiments, telephonic communication network(s) 120 may include any combination of a public switched telephone network (PSTN), a wireless wide area (WWA) communication network (e.g., a wireless cellular mobile communication network), a wireless local area (WLA) communication network (e.g., one or more Wi-Fi® communication networks, and/or the like).

Network(s) 130 may facilitate interconnection/interfaces between call agent 102, call routing policy server 114, and enterprise calling system 110, such as with call control manager 112, and with one or more enterprise on-premise locations 116-1-116-M. In various embodiments, network(s) 130 may include any combination of networks, such as the Internet, an IP wide area network (WAN), an Ethernet network, and/or the like.

Generally, enterprise calling system 110 may be representative of an IP-telephony network provided for and/or managed by an enterprise entity (e.g., a business entity, a government entity, an educational entity, etc.) that may span or otherwise be interconnected via any number of IP/communication networks, potentially overlapping in whole or in part with network(s) 130, and may facilitate IP-telephony calling services in which calls may be received by enterprise calling system 110 that have originated from telephonic communication network(s) 120 and/or calls may be transmitted towards telephonic communication network(s) 120 that have originated from within enterprise calling system 110 (e.g., originated from any of wireless and/or wired endpoint devices 118/119 for enterprise on-premise location 116-1). Generally, enterprise on-premise locations 116-1-116-M can be characterized as physical locations (e.g., buildings, stores, etc.) owned/operated by the enterprise entity operating/managing enterprise calling system 110.

In various embodiments, call routing policy server 114 may be implemented as an on-premise call routing policy server provided within enterprise calling system 110 or may be implemented as a cloud-hosted policy server provided via one or more cloud networks (not shown), which may or may not overlap with cloud networks hosting call agent 102. In some embodiments call routing policy server 114 may interface directly with call control manager 112 in addition to and/or in lieu of interfaces that may be facilitated via networks 130.

As shown in FIG. 1A, telephonic communication network(s) 120 can interface with call control manager 112 in which call control manager 112 may be considered a line edge device that bridges telephonic communications between external communication networks and or calling functions external to enterprise calling system, such as call agent 102. Call control manager 112 may also facilitate managing calls directed towards/received from wired endpoint devices for enterprise on-premise locations 116-1-116-M (e.g., wired endpoint devices 119) with external communication networks/functions. In some embodiments call control manager 112 may be implemented as a cloud-hosted call control manager. In some embodiments, telecommunication communication network(s) 120 may interface directly with call agent 102, rather than via call control manager.

It is to be understood that there may be flexibility with regard to where one or more elements of system 100 may reside, for example, in the cloud versus on-premise. Thus, variations with regard to the location of various elements of system 100 may be envisioned in accordance with embodiments herein.

In some instances, such as for wireless calls, call control manager 112 may also facilitate managing wireless calls directed towards/received from wireless endpoint devices for enterprise on-premise locations 116-1-116-M (e.g., wireless endpoint devices 118). For scenarios in which a given enterprise on-premise location may have an on-premise wireless local area network (WLAN) 117, such as a Wi-Fi® network or the like, call agent 102 can direct calls directly to wireless endpoint devices via network(s) 130 and the on-premise WLAN 117. Although embodiments herein are discussed with reference to WLAN operations, it is to be understood that embodiments herein may also be extended to facilitate cellular calling scenarios.

As shown in FIG. 1A, call agent 102 may be configured with a hunt group database 104 in which an 'N' number of hunt groups can be configured, such as a hunt groups 106-1, 106-2, thru 106-N in which each hunt group 106-1-106-N can be configured with a static call hunt policy that identifies, at least in part, a static set of enterprise endpoint devices that can be called for a given incoming call associated with a given hunt group.

Call routing is typically utilized in enterprise environments to facilitate handling incoming calls that are directed to an enterprise entity (e.g., directed generally to a store location, directed to a department of a given store, directed to a call center, etc.) such that the calls can be routed to one or more enterprise endpoint devices that may be provided and/or available at a given enterprise on-premise location.

Such call routing typically involves a call hunting process. In a call hunt process, an administrator can nominate a set of endpoints that are to be rung for an incoming call that is directed to a phone/dialed/calling number of an enterprise entity (e.g., a department of a store, a store in general, etc.). The set of endpoints can be identified via a hunt group that can be mapped to an enterprise-specific phone number, which may represent an identifier (ID) for the hunt group, in which the hunt group includes a call hunt policy that identifies, at least in part, the set of endpoints to which an incoming call that is received for the particular phone number is to be routed. In some instances, the call hunt policy defined for a hunt group can also identify a routing algorithm for routing incoming calls to endpoints of the hunt group, such as ringing all the endpoints simultaneously, ringing the devices in a particular order, etc.

With reference to FIG. 1A, consider that hunt groups 106-1-106-N may be configured for incoming calls that are directed to various phone numbers that may be associated with any number of enterprise on-premise location(s) 116-1-116-M (e.g., a department of a store, a store in general, etc.). A 'phone number' as discussed with reference to embodiments herein may be inclusive of 10-digit phone numbers, enterprise-specific internal phone numbers for an enterprise entity that may be more or less than 10-digits, any combinations thereof, or the like.

In one example, consider that hunt group 106-1 may be mapped to an enterprise-specific phone number for enterprise on-premise location 116-1 that is a Store 1 (S1) of the enterprise entity, such as an enterprise-specific phone number of '116100' (e.g., a general store phone number for location 116-1), and may identify a static set of endpoints to which an incoming call for the enterprise-specific phone number '116100' is to be routed. In another example, consider that hunt group 106-2 may be mapped to an enterprise-specific phone number for a particular department of the Store 1 (S1), such as a Department 1 (D1) of Store 1 (S1) that is associated with a phone number '116101' (e.g., S1 [location 116-1]. Department '01', as a simplified example), and may identify a static set of endpoints to which an incoming call for the enterprise-specific phone number '116101' is to be routed.

Although static hunt groups can be useful in enterprise environments, in some instances, an enterprise may discover that incoming calls directed to one or more stores have low answer rates and may want to improve such answer rates. One potential solution may involve giving associates mobile handsets (e.g., wireless endpoint devices 118) that could ring in addition to wired endpoints located for store departments, however, associates that are available at any given day/time can fluctuate in a larger manner based on day, time of day, turnover, etc.

This means that the mixture of phones that should be rung for an incoming call can be highly variable and may depend on checking for criteria (like time clock status) that is not available to some cloud-based enterprise calling servers/systems, such as may not be available to cloud-based call agent 102.

Thus, broadly in accordance with embodiments herein, system 100 may facilitate call handling operations that allow call agent 102 to suspend processing of an incoming call for a particular hunt group as identified for the incoming call while the call agent 102 queries a policy decision point for the enterprise calling system 110, such as routing policy server 114 (which may be hosted on-premise or may be cloud-hosted), that can provide a directive to the call agent 102 regarding the incoming call. In various the embodiments, a directive received from the routing policy server 114 for a particular hunt group query can instruct the call agent 102 to: reject the incoming call; offer the incoming call "as-is" to the static set of endpoints identified in a particular hunt group identified for the incoming call; or offer the incoming call to an alternate or updated set of endpoints that differs from the static set of endpoints configured for the particular hunt group identified for the incoming call (e.g., the updated list identifies at least one new endpoint that was not identified in the static hunt group configured at the call agent 102 and/or the updated list does not include at least one endpoint that was identified in the static hunt group). In some embodiments, a directive received form the routing server 114 for a particular hunt group can include a routing algorithm that identifies a calling strategy or pattern for ringing the endpoints identified in an updated list of endpoints. Various routing algorithms that may be utilized in accordance with embodiments herein are discussed in further detail, below.

Each hunt group 106-1-106-M configured for call agent 102 (e.g., each call hunt policy configured for each hunt group) can be enhanced with a 'policy-enabled' indication that identifies whether a particular hunt group is policy-enabled and, if so, provides identifying information for routing policy server 114, such as an IP address, a fully qualified domain name (FQDN), or the like, that enables the call agent 102 to query a policy decision point, such as policy routing server 114, for a directive regarding the particular hunt group. In some embodiments, a policy-enabled hunt group can be further configured with a "time out" indication such that, if no response is received from the routing policy server 114 regarding a query for a particular hunt group within a threshold amount of time (e.g., 1 second, etc.), the call agent 102 may proceed with processing for the incoming call in order to route the call to the static set of endpoints identified for the hunt group.

Assuming a response/directive is received (potentially within a threshold amount of time, if applicable) from the routing policy server 114 for a particular policy-enabled hunt group query, call agent 102 executes the directive. Thus, broadly, call agent 102 may be considered a policy enforcement point for policy-enabled hunt groups such that system 100 may facilitate policy-enabled call hunting in accordance with various embodiments herein.

Figure 1B:
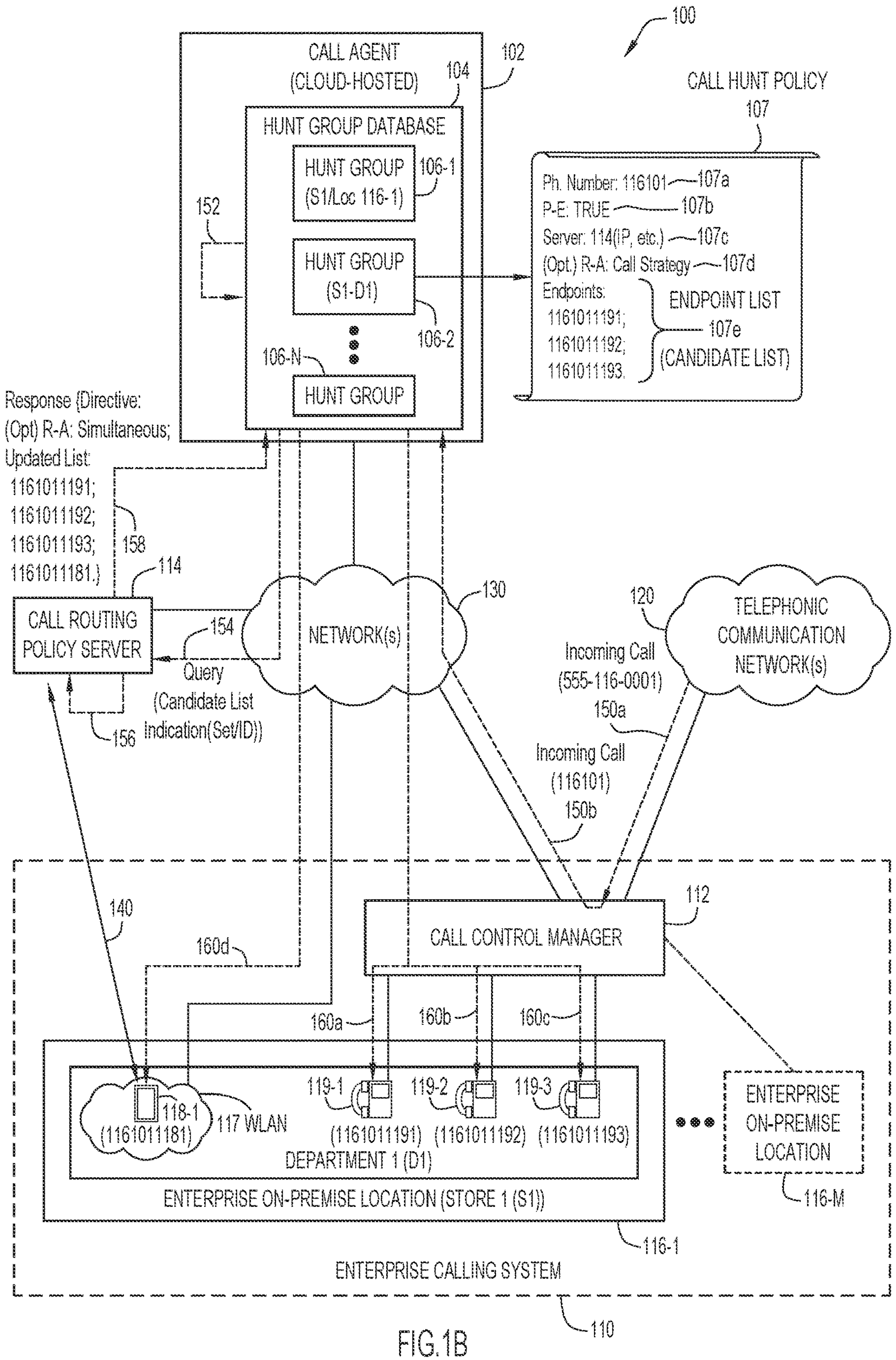
FIG. 1B is a block diagram illustrating example operations that may be performed via the system of FIG. 1A in order to facilitate policy-enabled call hunting, according to an example embodiment.

Consider an operational example through which system 100 can facilitate policy-enabled call hunting for a particular hunt group, as discussed with reference to FIG. 1B, in accordance with an example embodiment. As shown in FIG. 1B, consider than an incoming call, as generally illustrated by lines 150*a* and 150*b*, is received by call control manager 112 from a particular telephonic communication network, such as a PSTN, in which the incoming call is directed to the phone number '116101' for Department 1 for enterprise on-premise location 116-1 (a store).

FIG. 1B illustrates various example detail for the operational example in which three wired endpoint devices, such as a wired endpoint device 119-1, a wired endpoint device 119-2, and a wired endpoint device 119-3 are provided for the Department 1 (D1) for the Store 1 that is enterprise on-premise location 116-1. Further, for FIG. 1B, consider that a particular employee associated with a wireless endpoint device 118-1 is currently available for calling for Department 1 (e.g., is on-duty, clocked-in, determined to be within the vicinity of Department 1 based on location/positioning information determined for the wireless endpoint device 118-1 (using any known location/positioning techniques), etc.). A WLAN 117 is illustrated in FIG. 1B that may provide wireless local area radio frequency (RF) connectivity for wireless communications involving wireless endpoint device 118-1.

For the operational example of FIG. 1B, consider that wired endpoint device 119-1 is configured with a phone number of '1161011191', that wired endpoint device 119-2 is configured with a phone number of '1161011191', that wired endpoint device 119-3 is configured with a phone number of '1161011193', and that wireless endpoint device 118-1 that may be carried by a particular on-duty employee is configured with a phone number of '1161011181', as illustrated in FIG. 1B.

During operation of system 100, call routing policy server 114 can determine availability of certain employees/endpoint devices associated with the employees, as generally illustrated at 140. Through various operations, call routing policy server 114 can track, manage, or otherwise determine the availability of different enterprise endpoints/employees associated therewith that may potentially be available for answering a particular incoming call for any phone number of enterprise on-premise location(s), such as enterprise on-premise location 116-1 (Store 1), and/or any departments (e.g., Department 1) and/or other geographical areas of enterprise on-premise locations (e.g., store quadrants, parking facilities, etc.) using any techniques now known or hereinafter developed (e.g., time-card application logic).

For the present example, based on determining the availability of any number of enterprise endpoint devices, such as wireless endpoint device 118-1, call routing policy server 114 can utilize such availability information to provide dynamic call routing decisions for incoming calls to call agent 102, which therefore enables call agent 102 to perform dynamic call hunts in accordance with embodiments herein, as discussed below.

Consider for the operational example of FIG. 1B that hunt group 106-2 is configured with a call hunt policy 107. In the present example, consider that the call hunt policy 107 for hunt group 106-2 can be configured a phone number field 107*a* that is set to '116101', which can be used to identify the hunt group 106-2 and corresponding policy for an incoming call directed to the enterprise-specific phone number '116101'. Further, that the call hunt policy 107 can be configured with a policy-enabled (P-E) indicator field 107*b* that can be set to indicate whether the hunt group 106-2 is or is not policy-enabled. For the present example, consider that the P-E indicator field 107*b* is set to 'TRUE', which can be used to trigger call agent 102 to query the call routing policy server 114 upon receiving/identifying an incoming call that is directed to the hunt group 106-2.

Further, the call hunt policy 107 can be configured with a call routing policy server identification field 107*c* that can, for a policy-enabled hunt group, provide identifying information that enabled call agent to communicate with a call routing policy server. For the present example, consider that call routing policy server identification field 107*c* is configured with information (e.g., IP address, FQDN, etc.) that can be used to identify/communicate with call routing policy server 114.

Although only one call routing policy server is illustrated for system 100, it is to be understood that any number of call routing policy servers may be provided for an enterprise calling system in accordance with embodiments herein. For example, in some instances, different call routing policy servers may manage/determine endpoint/employee availability information for different departments across different stores, may manage/determine endpoint/availability information for different stores within different geographic region, and/or any combination/variation thereof. Thus, in some embodiments, different hunt groups defined for call agent 102 can identify different call routing policy servers.

Further, the call hunt policy 107 can, in some embodiments, optionally be configured with a routing algorithm (R-A) field 107*d* that can provide identifying information for a routing algorithm that identifies a calling pattern or strategy that can be used to ring endpoints identified the hunt group 106-2. Various routing algorithms can be envisioned for ringing endpoints associated with a hunt group in accordance with embodiments herein including simultaneous and serial ringing patterns or strategies, which are discussed in further detail, below.

The call hunt policy 107 can further be configured with an endpoint list 107*e* that identifies static set of endpoints that are to be rung for the hunt group 106-2. For the present example, consider that endpoint list 107*e* is configured with phone numbers for wired endpoint devices 119-1 (1161011191), 119-2 (1161011192), and 119-3 (1161011193).

Although not shown in FIG. 1B, in some instances, a time out field can be provided for a call hunt policy such that such that, if no response is received from the routing policy server 114 regarding a query for a particular policy-enabled hunt group within a threshold amount of time (e.g., 1 second, etc.), the call agent 102 may proceed with processing for the incoming call in order to route the call to the static set of endpoints identified for the hunt group.

The static set of endpoints identified within the endpoint list of a call hunt policy configured for a policy-enabled hunt group defined for call agent 102, such as endpoint list 107*e* as shown in FIG. 1B, can be referred to as a 'candidate list' of endpoints for the hunt group since the list of endpoints can be updated through a query/response exchange with call routing policy server 114 such that an 'updated list' of endpoints can be provided to the call agent 102 through a directive for the policy-enabled hunt group. Upon receiving the directive for the policy-enabled hunt group including the updated list of endpoints, the call agent 102 can route an incoming call for the hunt group to the endpoints identified in updated list in accordance with embodiments herein. Thus, certain information provided for a call hunt policy as configured for a policy-enabled hunt group defined for call agent 102, such as an endpoint list included in the policy, and potentially a routing algorithm included in the policy, can be overridden based on a directive received from the call routing policy server 114 for the policy-enabled hunt group.

For example, consider, as generally shown at 150*a*, that an incoming call directed to the enterprise calling system 110 is received by call control manager 112 from a particular telephonic communication network. In one example, the incoming call may be dialed for a 10-digit phone number associated with Store 1 for enterprise on-premise location 116-1, such as '555-116-0001', merely as an example. In one example, the call control manager 112 can translate the dialed phone number for the incoming call to an enterprise-specific phone number for Store 1. For the present example, consider that a person is attempting to contact an associate within Department 1 of Store 1 such that, through a series of call prompts, through the directly dialed number, etc. the call control manager 112 can identify that the incoming call is to be directed to endpoints for Department 1 of Store 1 in which the call control manager can translate the 10-digit phone number for the incoming call to the enterprise-specific phone number '116101' for Department 1 of Store 1 or otherwise can provide the enterprise-specific phone number '116101' based on caller inputs, etc. and directs the incoming call to call agent 102, as generally shown at 150*b*, to enable the call agent 102 to determine a set of endpoints to ring for the call.

As generally shown at 152, upon obtaining the incoming call (150*b*), the call agent 102 identifies hunt group 106-2 and corresponding call hunt policy 107 for the incoming call based, for example, on matching the enterprise-specific phone number of '116101' to the phone number identified in phone number field 107*a*. Upon identifying hunt group 106-2, call agent 102 can further identify at 152 that the hunt group 106-2 is a policy-enabled hunt group based on the P-E field 107*b* being set to TRUE, which triggers call agent 102 to query call routing policy server 114 to determine a directive regarding the hunt group 106-2.

For example, as shown at 154, call agent 102 sends a query message to the call routing policy server 114 that includes an indication of the candidate list of endpoints associated with hunt group 106-2 in which the query is sent to the call routing policy server 114 to determine whether the incoming call is to be routed to the endpoint devices identified in the candidate list. In one embodiment, the indication included in the query sent at 154 may include identifying information for the candidate list of endpoints identified within the call hunt policy 107 configured for hunt group 106-2, such as each of the phone numbers 1161011191, 1161011192, and 1161011193 included in endpoint list 107*e*. In one embodiment, the indication included in the query sent at 154 may include an identifier associated with the candidate list, such as the phone number for the hunt group 106-2 (e.g., 116101).

Upon obtaining the query, call routing policy server 114 can determine a directive regarding the hunt group 106-2 based on availability information maintained for employees/endpoints associated with Department 1 (utilizing any known technique), as generally shown at 156. In the present example, consider that call routing policy server 114 has determined the wireless endpoint 118-1/the employee associated therewith is available to be rang for the incoming call. As such, consider that that call routing policy server 114 sends a response message (directive) to call agent 102, as generally shown at 158, including an updated list of endpoints that the call agent 102 is to utilize for routing the incoming call. Specifically for the present example, the updated list identifies each of (wired devices 119-1-119-3) 1161011191, 1161011192, 1161011193, and (wireless device 118-1) 1161011181 that call agent 102 is to ring for the hunt group 106-2.

Thus, in at least one embodiment, an updated list of endpoints sent from call routing policy server 114 for a particular query involving a particular policy-enabled hunt group may consist of existing static endpoints/members of an endpoint list defined for the call hunt policy of the hunt group, supplemented with identities/phone numbers of on-duty associates/endpoints associated therewith that should also be rung for the hunt group.

However, other variations for an updated list sent from call routing policy server 114 for a particular query involving a particular policy-enabled hunt group. For example, in at least one embodiment, one or more existing static endpoints of an endpoint list defined for the call hunt policy of the hunt group could be removed from the updated list, while the updated list could further be supplemented with identities/phone numbers of on-duty associates/endpoints associated therewith that should also be rung for the hunt group.

In some embodiments, if the call routing policy server 114 does not reply to a query within a certain time frame, such as identified via a time out indication provided for a call hunt policy, the call agent 102 can either reject an incoming call or offers the call to the static list of endpoints identified in the call hunt policy, potentially depending on a configured setting provided for the hunt group.

In some embodiments, a directive sent from call routing policy server 114 for a particular hunt group may optionally include a routing algorithm (R-A) indication that identifies a calling/ringing pattern or strategy that can be used to ring endpoints identified the hunt group 106-2. Various routing algorithms can be envisioned for ringing endpoints associated with a hunt group in accordance with embodiments herein including simultaneous and serial calling/ringing patterns or strategies, as noted above.

For example, in at least one embodiment, a routing algorithm can identify a simultaneous calling strategy for a hunt group such that a simultaneous ringing or calling pattern/strategy can be used to simultaneously ring/call all endpoints for the hunt group. In at least one embodiment, a serial routing algorithm can be identified for a hunt group that identifies a serial ringing pattern or strategy for calling endpoint(s) of a hunt group.

Different algorithms can be utilized for serial ringing, including, but not limited to a top-down serial strategy, in which incoming calls for a particular set of endpoints for a hunt list are to always be offered in a fixed order from top to bottom (i.e., from a first endpoint of the list to a last endpoint of the list); a circular serial strategy, in which subsequent incoming calls for a particular set of endpoints of a hunt list are to start hunting beginning with subsequent members of the hunt list; a longest-idle serial strategy, in which endpoints or members of a hunt list are ordered according to how recently they have been involved with calls (e.g., least (endpoint that has been idle the longest amount of time) to most recently (endpoint that has been idle the shortest amount of time); and a weighted serial strategy, in which calls can be offered to endpoints of a hunt list on a statistical basis. In at least one embodiment, a statistical basis may facilitate a weighted hunt such that calls can be offered to endpoints in a weighted manner that is dependent on employee role, status, or any other employee factor. For example, a larger percentage of incoming calls (e.g., ⅔ of incoming calls) can be offered to employees that satisfy a certain status level (e.g., X number of years of employment) while a smaller percentage of the incoming calls can be offered to employees that do not satisfy the status level. Other variations, conditions, etc. can be envisioned with regard to weighted hunt lists. Thus, different routing criterion can be used to facilitate routing decisions for ringing endpoints in accordance with various serial routing algorithms.

At least some of these serial routing algorithms (e.g., circular, longest-idle, and possibly weighted) may involve maintaining an overall state for which calls have been (previously) offered to endpoints for an enterprise on-premise location on a call-to-call basis. In various embodiments, such state tracking may be performed by call agent 102 or may be performed by call routing policy server 114 (e.g., if call agent 102 supports a serial top-down non-stateful calling strategy) in which call routing policy server 114 may provide an updated list to call agent 102 comprising numbers in a specified order by which the call agent 102 is to offer an incoming call or may provide an indication to call agent 102 regarding a number of the updated list at which the call agent 102 to start offering an incoming call. In at least some implementations, tracking and acting on this state may represent a differentiation between policy-enabled call hunting versus policy-enabled call routing. For example, with policy-enabled call routing, an incoming call may be re-routed to a single endpoint, however, with policy-enabled call hunting, an incoming call may first be identified by the call agent 102 as being associated with a static group of endpoints and then, through a dynamic exchange with call routing policy server 114, the call agent 102 can receive a new directive for routing the incoming call that can include an updated list of endpoints and potentially a strategy for calling the endpoints, which, in some instances, may involve tracking and acting on a state of previous call hunts for the list of endpoints.

Continuing with the present operational example, upon obtaining the response at 158 including the updated list of endpoints identifying each of (wired devices 119-1-119-3) 1161011191, 1161011192, 1161011193, and (wireless device 118-1) 1161011181, call agent 102 rings the endpoints, as generally shown at 160*a*, 160*b*, 160*c*, and 160*d* (via WLAN 117), according to a given routing algorithm as identified in the call hunt policy 107 or, as potentially identified, in the directive received from call routing policy server 114.

Accordingly, with policy-enabled call hunting as provided in accordance with embodiments herein, any availability determination made by call routing policy server 114 (e.g., based on a time-card application tracking when employees sign-in/sign-out, take breaks, etc.) for the enterprise calling system 110 can become a source of truth for determining whether an agent/employee is on-duty/available. For example, in a scenario involving a non-policy-enabled hunt group, a call agent/database would need manual updates as employee status is changed (e.g., employees are on-boarded, off-boarded, etc.). However, for the policy-enabled call-hunting techniques as provided in accordance with embodiments herein, decisions are offloaded from the call agent 102 to call routing policy server 114, which can determine all relevant status for employees, such as on-boarded, off-boarded, available, on-duty, off-duty, is within a geographical vicinity of a given location/department, etc. without requiring call agent 102 hunt group database 104 updates.

Thus, call hunting for policy-enabled hunt groups can be modified in accordance with embodiments herein such that call agent 102 can consult with call routing policy server 114 to determine an availability of endpoints (e.g., on-duty associates) that can be offered incoming calls on a call-by-call basis. Such operations can permit a “back-office system” (e.g., a timecard tracking system, etc. provided via call routing policy server 114) to make business-specific decisions regarding call coverage patterns.

With reference to FIGS. 2A, 2B, 2C, and 2D, FIGS. 2A, 2B, 2C, and 2D are diagrams illustrating example user interface screens that can be utilized to facilitate policy-enabled call hunting, in accordance with various example embodiments.

Figure 2A:
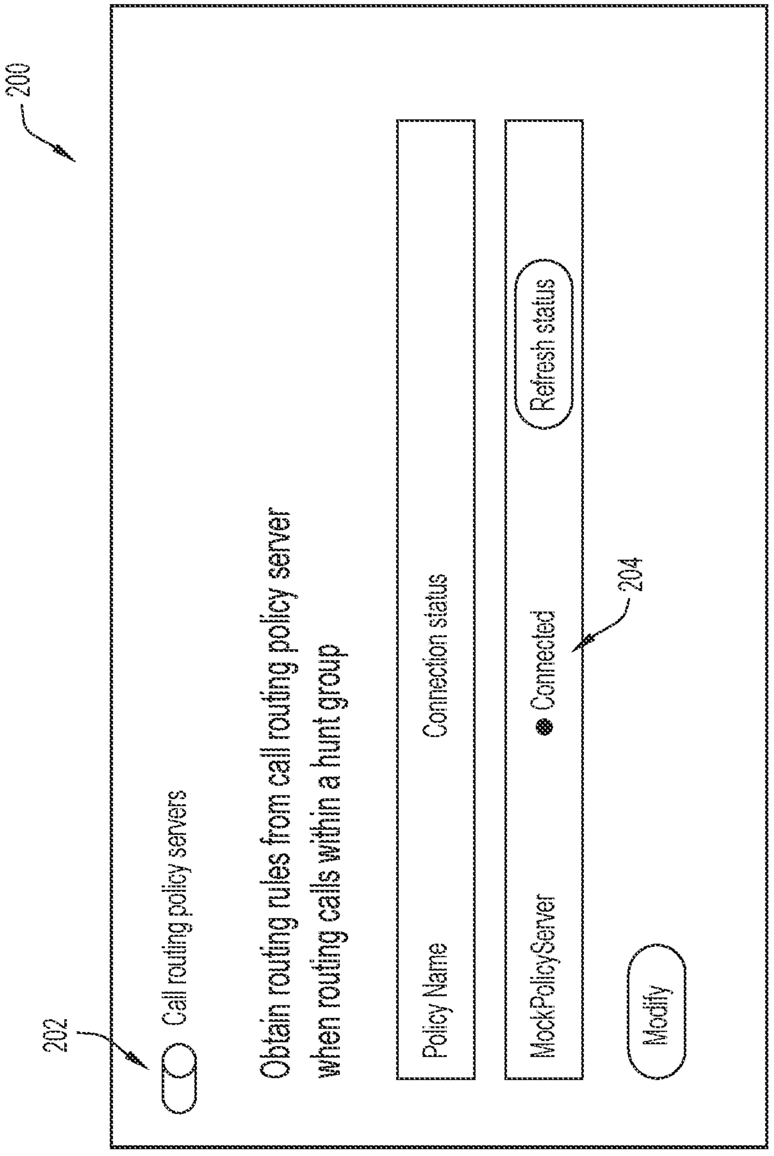
FIGS. 2A, 2B, 2C, and 2D are diagrams illustrating example user interface screens that can be utilized to facilitate policy-enabled call hunting, according to an example embodiment.
Figure 2B:
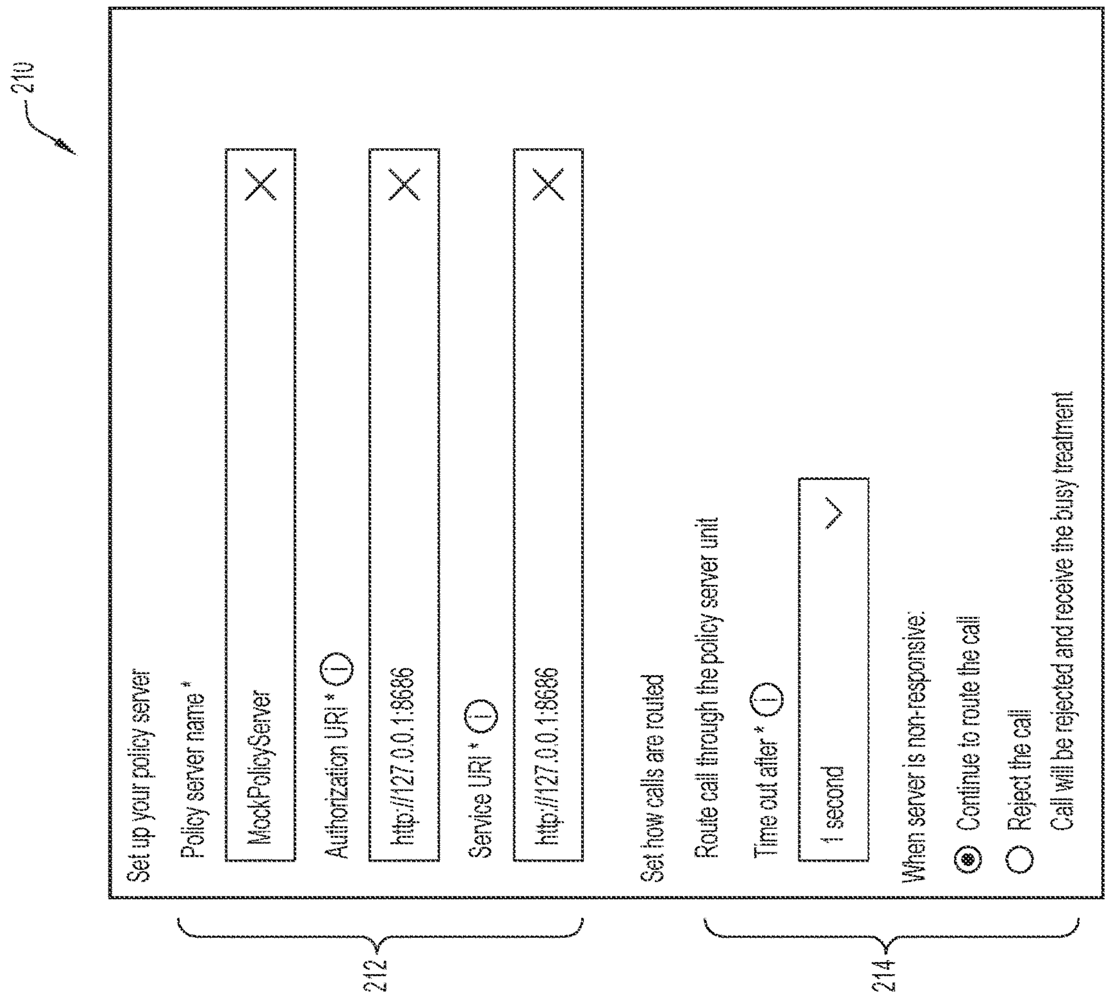

For example, FIG. 2A illustrates an example user interface screen 200 and FIG. 2B illustrates an example user interface screen 210, each of which can be utilized to configure call routing policy server details that can be utilized for one or more policy-enabled hunt groups configured for a call agent, such as call agent 102, according to an example embodiment.

As shown in FIG. 2A, user interface screen 200 can include a user interface element 202 that enables an enterprise administrator to enable call routing decisions for the call agent to involve consulting a call routing policy server. As shown in FIG. 2B, user interface screen 210 can include user interface elements 212 that enable the enterprise administrator to configure a name for the call routing policy server, as well as various identifying information for the policy server (e.g., Uniform Resource Identifiers (URIs), IP addresses, FQDNs, etc.). Further, user interface elements 214 can be provided that enable the enterprise administrator to configure additional routing rules for interfacing with the call routing policy server, such as time out information for query/response exchanges involving the call routing policy server, as well as handling scenarios for instances in which no response may be received from the call routing policy server within the time out time frame.

Referring back to FIG. 2A, once configured (via user interface screen 210 as shown in FIG. 2B), connection information for the call routing policy server can be identified via user interface screen 200, as shown at 204, such as a connection status between the call agent and the call routing policy server.

Figure 2C:
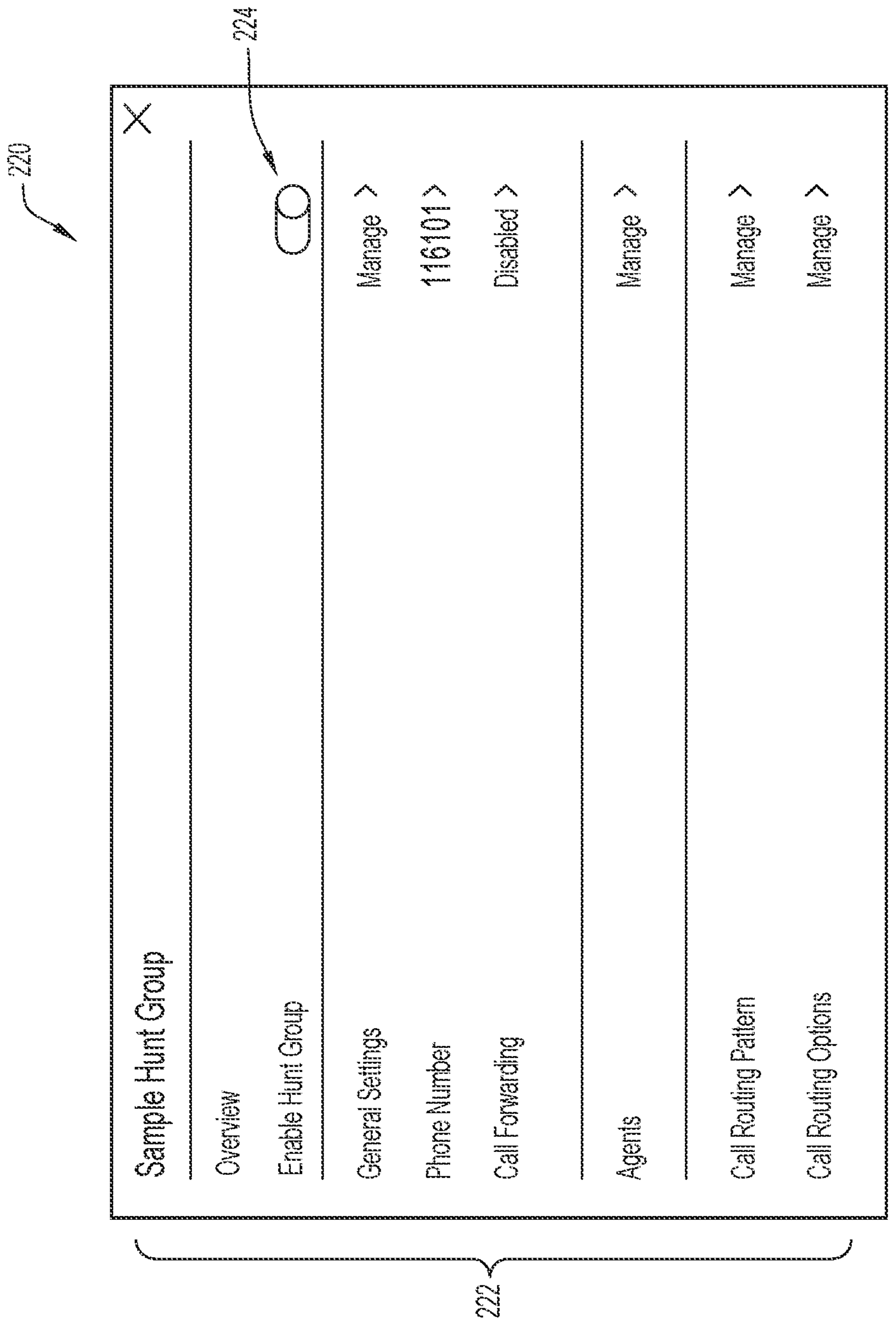
Figure 2D:
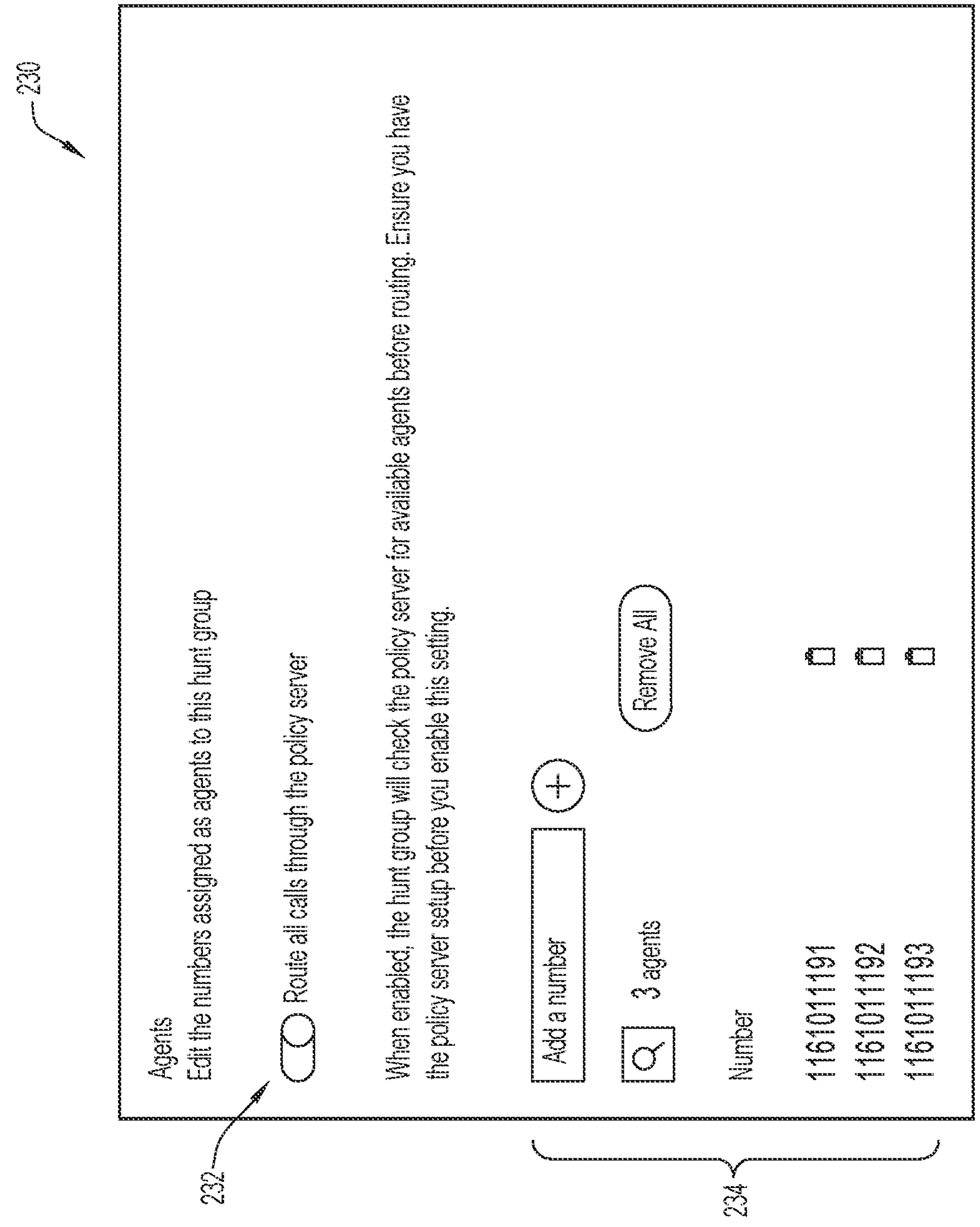

Continuing to FIGS. 2C and 2D, FIG. 2D illustrate example user interface screens 220 and 230, respectively, that can be used to configure a call hunt policy for a hunt group; in particular, for configuring the hunt group to be a policy-enabled hunt group, according to an example embodiment.

For example, as shown in FIG. 2C, user interface screen 220 can include various user interface elements 222 that enable an enterprise administrator to configure various details for a hunt group, such as a name for the hunt group, along various settings, such as a phone number for the hunt group, a routing algorithm (e.g., pattern) for the hunt group, etc. in which the various settings are used to define the call hunt policy for the hunt group. Further, a user interface element 224 can be provided that can enable the administrator to enable or disable the hunt group.

As shown in FIG. 2D, user interface screen 230 can be utilized to enable the hunt group to be a policy-enabled hunt group by providing a user interface element 232, which allows the enterprise administrator to enable or disable consultation of the call routing policy server for call hunting directives regarding the hunt group. As shown in FIG. 2D, the user interface element 232 is toggled such that the hunt group is to be treated (by the call agent) as a policy-enabled hunt group such that the call routing policy server (as configured, for example, via user interface screens 200 of FIG. 2A and 210 of FIG. 2B) is to be consulted regarding call hunting directives for incoming calls involving the hunt group.

Also shown in FIG. 2D, a static list of endpoints or agents can be configured for the hunt group via user interface elements 234, through which the enterprise administrator can add or remove phone numbers for endpoints that are to be identified in the endpoint list of the call hunt policy provided for the hunt group.

Figure 3:
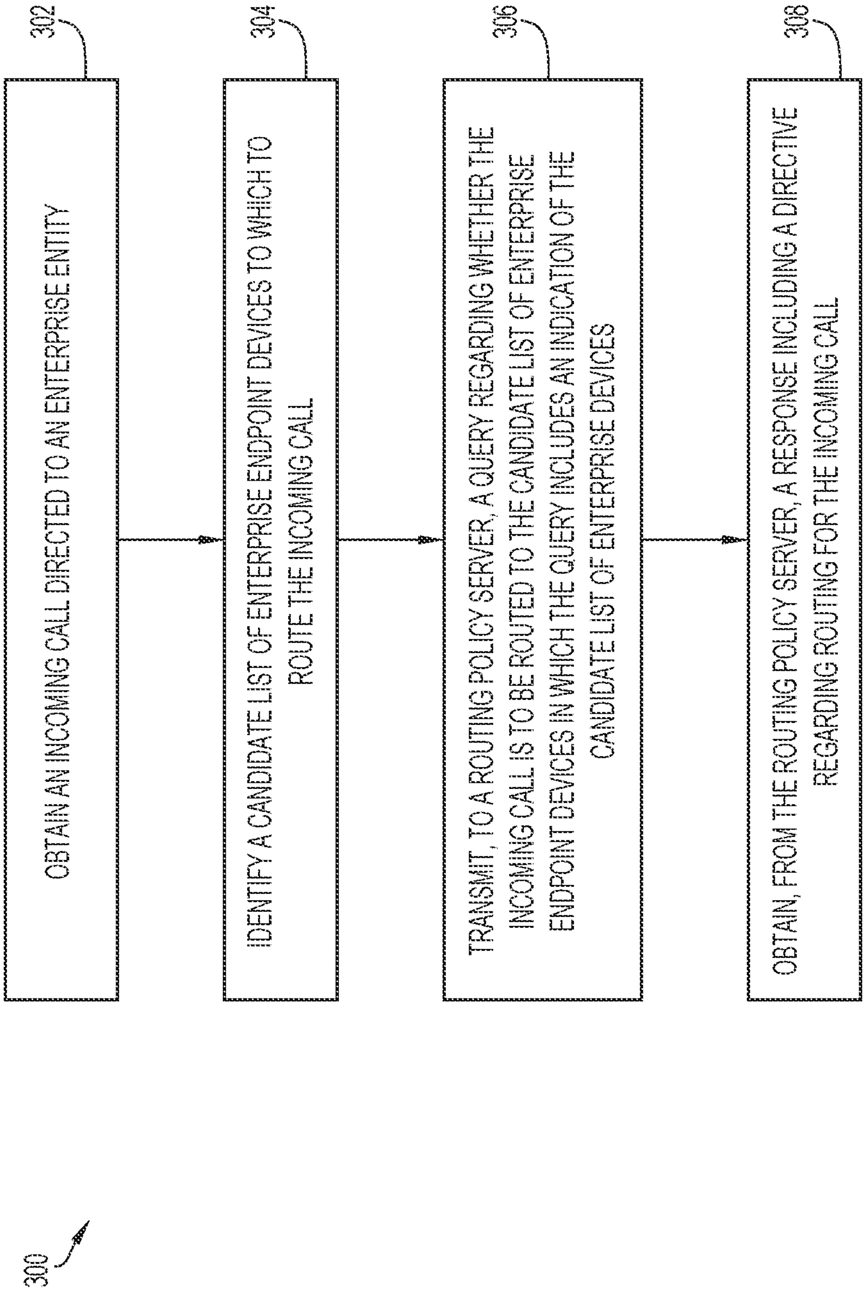
FIG. 3 is a flow chart depicting a method according to an example embodiment.

Referring to FIG. 3, FIG. 3 is a flowchart depicting a method 300 according to an example embodiment. In at least one embodiment, method 300 may be associated with operations that may be utilized to facilitate policy-enabled call hunting, according to an example embodiment. In at least one embodiment, method 300 may be performed by a computing device or combination of computing devices as discussed for embodiments herein, such as via call agent 102 and/or call routing policy server 114.

As shown at 302, the method may include obtaining an incoming call directed to an enterprise entity. For example, a call agent, such as call agent 102 can receive an incoming call including a phone number that is directed to an enterprise on-premise location, such as a store, a department of the store, or the like.

At 304, the method may include identifying a candidate list of enterprise endpoint devices to which to route the incoming call. For example, the call agent can identify a static endpoint list (candidate list) that is defined for a call hunt policy of a hunt group that is identified based on the phone number for the incoming call.

At 306, the method may include transmitting, to a routing policy server, a query regarding whether the incoming call is to be routed to the candidate list of enterprise endpoint devices in which the query includes an indication of the candidate list of enterprise devices. In one instance, the indication of the candidate list of enterprise endpoint devices included in the query can be an identifier associated with the candidate list, such as the phone number configured for the call hunt policy for the hunt group. In one instance, the indication of the candidate list of enterprise endpoint devices included in the query is identifying information associated with each of the enterprise endpoint devices of the candidate list.

At 308, the method may include obtaining, from the routing policy server, a response including a directive regarding routing for the incoming call. In at least one embodiment, the directive can include an updated list of enterprise endpoint devices to which to route the incoming call in which the updated list is different than the candidate list. In one instance, the updated list can identify at least one new enterprise endpoint device that is not included in the candidate list of enterprise endpoint devices. In at least one instance, the at least one new enterprise endpoint device can be included in the updated list based on availability information of at least one enterprise user associated with the at least one new enterprise endpoint device or a location associated with the at least one new enterprise endpoint device (e.g., the device is in/near a department that is to be called, etc.). In one instance, the updated list does not include at least one endpoint device that is included in the candidate list of enterprise endpoint devices. In at least one embodiment, the directive can indicate that the call agent is to offer the incoming call "as-is" to the static set of endpoints identified in the candidate list.

In one instance, although not shown in FIG. 3, the method may include obtaining, from the routing policy server, a response or directive indicating that the incoming call is to be rejected (e.g., it is not to be routed to any enterprise endpoint devices). In one instance, although not shown in FIG. 3, the method may include, upon determining, by the call agent, that a response is not received from the routing policy server within a threshold amount of time, either rejecting the incoming call or routing the incoming call to the candidate list of enterprise endpoint devices. The determination of whether to reject the incoming call or to route the incoming call to the candidate list of enterprise endpoint devices can be determined based on a configuration setting provided for the call hunt policy of the hunt group.

Figure 4:
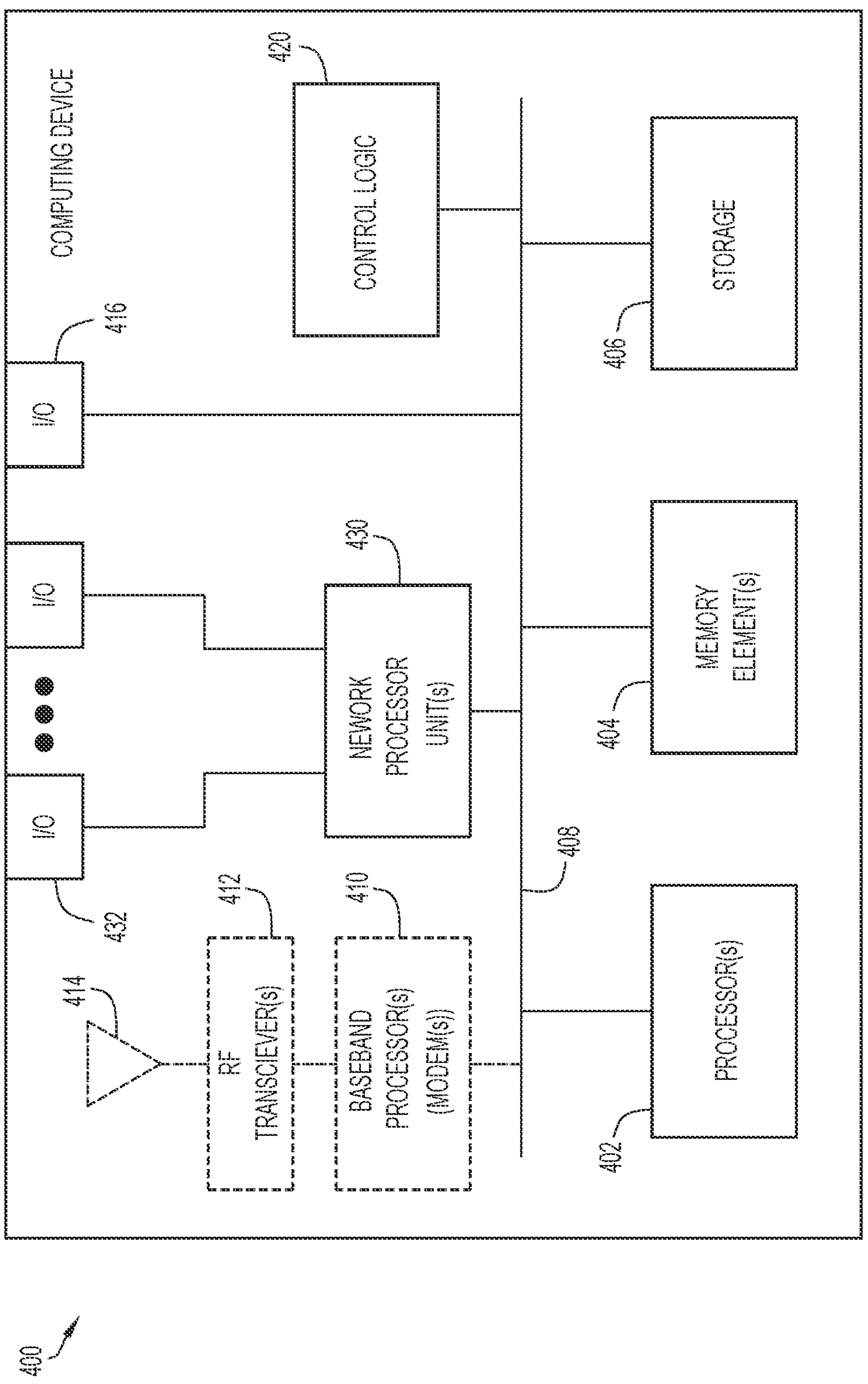
FIG. 4 is a hardware block diagram of a computing device that may perform functions associated with any combination of operations discussed in connection with techniques described for embodiments herein.

Referring to FIG. 4, FIG. 4 illustrates a hardware block diagram of a computing device 400 that may perform functions associated with operations discussed herein in connection with the techniques depicted via FIGURES as provided herein. In various embodiments, a computing device or apparatus, such as computing device 400 or any combination of computing devices 400, may be configured as any entity/entities as discussed for the techniques depicted in connection with operations illustrated/discussed for various embodiments herein, such as call agent 102, call control manager 112, call routing policy server 114, any wireless and/or wired endpoint devices discussed herein, and/or any other elements/functions/nodes discussed herein.

In at least one embodiment, the computing device 400 may be any apparatus that may include one or more processor(s) 402, one or more memory element(s) 404, storage 406, a bus 408, one or more network processor unit(s) 430 interconnected with one or more network input/output (I/O) interface(s) 432, one or more I/O interface(s) 416, and control logic 420. In various embodiments, instructions associated with logic for computing device 400 can overlap in any manner and are not limited to the specific allocation of instructions and/or operations described herein.

For embodiments in which computing device 400 may be implemented as any device capable of wireless communications, computing device 400 may further include at least one baseband processor or modem 410, one or more radio RF transceiver(s) 412 (e.g., any combination of RF receiver(s) and RF transmitter(s)), one or more antenna(s) or antenna array(s) 414.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 430 may enable communication between computing device 400 and other systems, entities, etc., via network I/O interface(s) 432 (wired and/or wireless) to facilitate operations discussed for various embodiments described herein. In various embodiments, network processor unit(s) 430 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 432 can be configured as one or more Ethernet port(s), Fibre Channel ports, any other I/O port(s), and/or antenna(s)/antenna array(s) now known or hereafter developed. Thus, the network processor unit(s) 430 and/or network I/O interface(s) 432 may include suitable interfaces for receiving, transmitting, and/or otherwise communicating data and/or information (wired and/or wirelessly) in a network environment.

I/O interface(s) 416 may allow for input and output of data and/or information with other entities that may be connected to computing device 400. For example, I/O interface(s) 416 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 400 is implemented as a wireless device or any apparatus capable of wireless communications, the RF transceiver(s) 412 may perform RF transmission and RF reception of wireless signals via antenna(s)/antenna array(s) 414, and the baseband processor or modem 410 performs baseband modulation and demodulation, etc. associated with such signals to enable wireless communications for computing device 400.

In various embodiments, control logic 420, can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining an incoming call directed to an enterprise entity; identifying a candidate list of enterprise endpoint devices to which to route the incoming call; transmitting, to a routing policy server, a query regarding whether the incoming call is to be routed to the candidate list of enterprise endpoint devices, wherein the query includes an indication of the candidate list of enterprise devices; and obtaining, from the routing policy server, a response including an updated list of enterprise endpoint devices to which to route the incoming call, wherein the updated list is different than the candidate list.

In one instance, the updated list can identify at least one new enterprise endpoint device that is not included in the candidate list of enterprise endpoint devices. In at least one instance, the at least one new enterprise endpoint device is included in the updated list based on availability information of at least one enterprise user associated with the at least one new enterprise endpoint device. In one instance, the updated list does not include at least one endpoint device that is included in the candidate list of enterprise endpoint devices.

In at least one instance, the response further can further identify a strategy through which to route the incoming call to the enterprise endpoint devices of the updated list. In at least one instance, the strategy can indicate that the incoming call is to be routed to all of the enterprise endpoint devices simultaneously.

In at least one instance, the strategy can indicate one of: a top-down serial strategy in which routing for the incoming call is to be provided in a fixed order from a first enterprise endpoint of the updated list to a last enterprise endpoint of the updated list; a circular serial strategy in which routing for the incoming call is to start with a first enterprise endpoint device of the updated list; a longest-idle serial strategy in which routing for the incoming call is to start with an enterprise endpoint device of the updated list that has been idle a longest amount of time; or a weighted serial strategy in which the incoming call is to start with an enterprise endpoint device of the updated list based on a statistical basis.

In at least one instance, the indication of the candidate list of enterprise endpoint devices included in the query is an identifier associated with the candidate list. In at least one instance, the indication of the candidate list of enterprise endpoint devices included in the query is identifying information associated with each of the enterprise endpoint devices of the candidate list.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X. Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

configuring a policy-enabled indicator in a call hunt policy, the policy-enabled indicator including a configurable field that specifies whether consultation of a routing policy server to be performed for routing an incoming call, such that a query to the routing policy server is transmitted when the policy-enabled indicator indicates that a hunt group is policy-enabled;

obtaining, by a call agent, an incoming call directed to an enterprise entity;

identifying, by the call agent and based on the incoming call, the hunt group including the call hunt policy, wherein the call hunt policy comprises a candidate list of enterprise endpoint devices to which to route the incoming call;

determining, by the call agent, that the call hunt policy includes the policy-enabled indicator that is set to true to indicate that the call agent is to query the routing policy server to determine whether the incoming call is to be routed to the candidate list of enterprise endpoint devices, wherein the call hunt policy further comprises identifying information for the routing policy server;

based on the policy-enabled indicator being set to true for the call hunt policy and the identifying information for the routing policy server included in the call hunt policy, transmitting, by the call agent to the routing policy server, a query regarding whether the incoming call is to be routed to the candidate list of enterprise endpoint devices, wherein the query includes an indication of the candidate list of enterprise endpoint devices, the routing policy server is to determine a plurality of status indicators associated with a plurality of enterprise employees corresponding to the enterprise endpoint devices, the plurality of status indicators indicating whether the plurality of enterprise employees are available to answer the incoming call; and obtaining, by the call agent from the routing policy server, a response including an updated list of enterprise endpoint devices to which to route the incoming call, wherein the updated list is different than the candidate list.

2. The method of claim 1, wherein the updated list identifies at least one new enterprise endpoint device that is not included in the candidate list of enterprise endpoint devices.

3. The method of claim 1, wherein the updated list does not include at least one endpoint device that is included in the candidate list of enterprise endpoint devices.

4. The method of claim 1, wherein the response further identifies a strategy through which to route the incoming call to the enterprise endpoint devices of the updated list.

5. The method of claim 4, wherein the strategy indicates that the incoming call is to be routed to all of the enterprise endpoint devices simultaneously.

6. The method of claim 4, wherein the strategy indicates one of:

a top-down serial strategy in which routing for the incoming call is to be provided in a fixed order from a first enterprise endpoint of the updated list to a last enterprise endpoint of the updated list;

a circular serial strategy in which routing for the incoming call is to start with a first enterprise endpoint device of the updated list;

a longest-idle serial strategy in which routing for the incoming call is to start with an enterprise endpoint device of the updated list that has been idle a longest amount of time; or a weighted serial strategy in which the incoming call is to start with an enterprise endpoint device of the updated list based on a statistical basis.

7. The method of claim 1, wherein the indication of the candidate list of enterprise endpoint devices included in the query is an identifier associated with the candidate list.

8. The method of claim 1, wherein the indication of the candidate list of enterprise endpoint devices included in the query is identifying information associated with each of the enterprise endpoint devices of the candidate list.

9. The method of claim 1 wherein the identifying information for the routing policy server is a Uniform Resource Identifier (URI), an Internet Protocol (IP) address, or a fully qualified domain name (FQDN) for the routing policy server.

10. The method of claim 1, wherein the plurality of status indicators includes an on-boarded indicator, an on-duty indicator, and a geographical vicinity indicator.

11. One or more non-transitory computer readable storage media encoded with instructions that, when executed by a processor, cause the processor to perform operations, comprising:

configuring a policy-enabled indicator in a call hunt policy, the policy-enabled indicator including a configurable field that specifies whether consultation of a routing policy server to be performed for routing an incoming call, such that a query to the routing policy server is transmitted when the policy-enabled indicator indicates that a hunt group is policy-enabled;

obtaining, by a call agent, an incoming call directed to an enterprise entity;

identifying, by the call agent and based on the incoming call, the hunt group including the call hunt policy, wherein the call hunt policy comprises a candidate list of enterprise endpoint devices to which to route the incoming call;

determining, by the call agent, that the call hunt policy includes the policy-enabled indicator that is set to true to indicate that the call agent is to query the routing policy server to determine whether the incoming call is to be routed to the candidate list of enterprise endpoint devices, wherein the call hunt policy further comprises identifying information for the routing policy server;

based on the policy-enabled indicator being set to true for the call hunt policy and the identifying information for the routing policy server included in the call hunt policy, transmitting, by the call agent to the routing policy server, a query regarding whether the incoming call is to be routed to the candidate list of enterprise endpoint devices, wherein the query includes an indication of the candidate list of enterprise endpoint devices, the routing policy server is to determine a plurality of status indicators associated with a plurality of enterprise employees corresponding to the enterprise endpoint devices, the plurality of status indicators indicating whether the plurality of enterprise employees are available to answer the incoming call; and obtaining, by the call agent from the routing policy server, a response including an updated list of enterprise endpoint devices to which to route the incoming call, wherein the updated list is different than the candidate list.

12. The media of claim 11, wherein the response further identifies a strategy through which to route the incoming call to the enterprise endpoint devices of the updated list.

13. The media of claim 12, wherein the strategy indicates one of:

a top-down serial strategy in which routing for the incoming call is to be provided in a fixed order from a first enterprise endpoint of the updated list to a last enterprise endpoint of the updated list;

a circular serial strategy in which routing for the incoming call is to start with a first enterprise endpoint device of the updated list;

a longest-idle serial strategy in which routing for the incoming call is to start with an enterprise endpoint device of the updated list that has been idle a longest amount of time;

a weighted serial strategy in which the incoming call is to start with an enterprise endpoint device of the updated list based on a statistical basis or that the incoming call is to be routed to all of the enterprise endpoint devices simultaneously.

14. An apparatus comprising:

at least one memory element for storing data; and at least one processor for executing instructions associated with the data, wherein executing the instructions causes the apparatus to perform operations for a call agent, comprising:

configuring a policy-enabled indicator in a call hunt policy, the policy-enabled indicator including a configurable field that specifies whether consultation of a routing policy server to be performed for routing an incoming call, such that a query to the routing policy server is transmitted when the policy-enabled indicator indicates that a hunt group is policy-enabled;

obtaining, by the call agent, an incoming call directed to an enterprise entity;

identifying, by the call agent and based on the incoming call, the hunt group including the call hunt policy, wherein the call hunt policy comprises a candidate list of enterprise endpoint devices to which to route the incoming call;

determining, by the call agent, that the call hunt policy includes the policy-enabled indicator that is set to true to indicate that the call agent is to query the routing policy server to determine whether the incoming call is to be routed to the candidate list of enterprise endpoint devices, wherein the call hunt policy further comprises identifying information for the routing policy server;

based on the policy-enabled indicator being set to true for the call hunt policy and the identifying information for the routing policy server included in the call hunt policy, transmitting, by the call agent to the routing policy server, a query regarding whether the incoming call is to be routed to the candidate list of enterprise endpoint devices, wherein the query includes an indication of the candidate list of enterprise endpoint devices, the routing policy server is to determine a plurality of status indicators associated with a plurality of enterprise employees corresponding to the enterprise endpoint devices, the plurality of status indicators indicating whether the plurality of enterprise employees are available to answer the incoming call; and obtaining, by the call agent from the routing policy server, a response including an updated list of enterprise endpoint devices to which to route the incoming call, wherein the updated list is different than the candidate list.

15. The apparatus of claim 14, wherein the updated list identifies at least one new enterprise endpoint device that is not included in the candidate list of enterprise endpoint devices.

16. The apparatus of claim 15, wherein the at least one new enterprise endpoint device is included in the updated list based on availability information of at least one enterprise user associated with the at least one new enterprise endpoint device.

17. The apparatus of claim 14, wherein the updated list does not include at least one endpoint device that is included in the candidate list of enterprise endpoint devices.

18. The apparatus of claim 14, wherein the response further identifies a strategy through which to route the incoming call to the enterprise endpoint devices of the updated list.

19. The apparatus of claim 18, wherein the strategy indicates that the incoming call is to be routed to all of the enterprise endpoint devices simultaneously.

20. The apparatus of claim 18, wherein the strategy indicates one of:

a top-down serial strategy in which routing for the incoming call is to be provided in a fixed order from a first enterprise endpoint of the updated list to a last enterprise endpoint of the updated list;

a circular serial strategy in which routing for the incoming call is to start with a first enterprise endpoint device of the updated list;

a longest-idle serial strategy in which routing for the incoming call is to start with an enterprise endpoint device of the updated list that has been idle a longest amount of time; or a weighted serial strategy in which the incoming call is to start with an enterprise endpoint device of the updated list based on a statistical basis.

* * * * *